Patented Aug. 18, 1953

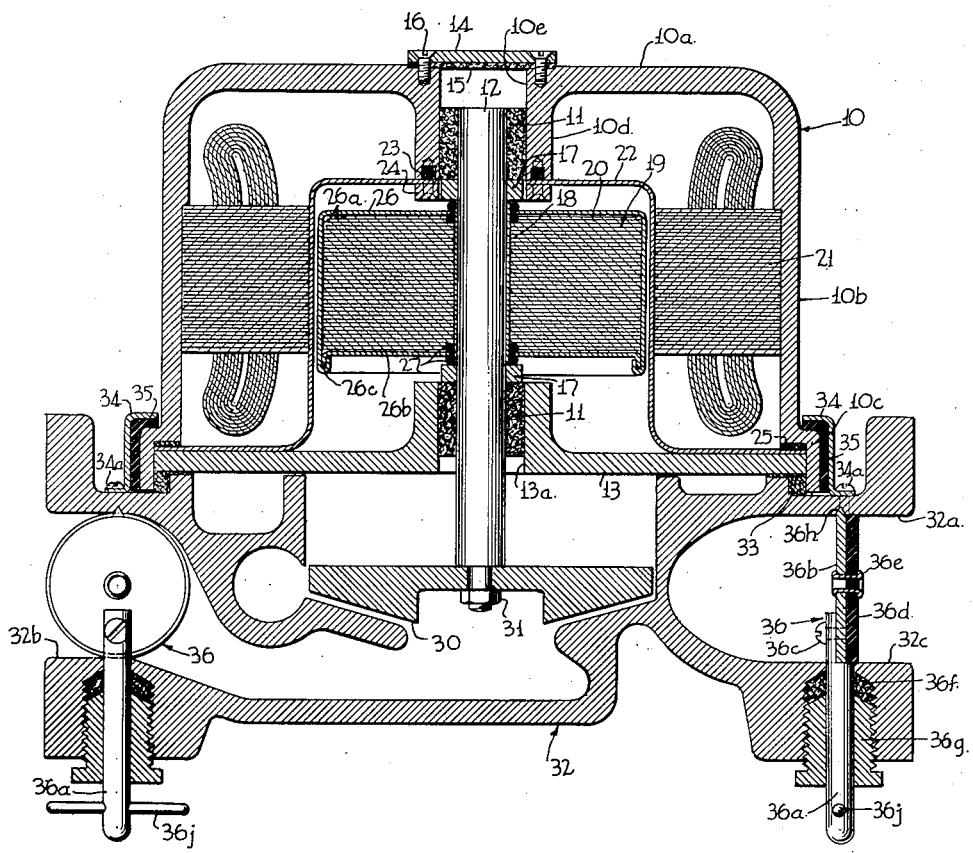

2,649,049

UNITED STATES PATENT OFFICE 2,649,049

FLUID-SHIELDED DYNAMOELECTRIC DEVICE FOR IMMERSED PUMPS AND THE LIKE

Rinaldo F. Pezzillo, Audubon, N. J., and Anthony H. Pezzillo and George C. Tatem, Philadelphia, Pa., assignors to Mono Products Inc., Philadelphia, Pa., a corporation of Pennsylvania Application May 4, 1950, Serial No. 160,054

6 Claims. (Cl. 103—87)

1

This invention relates to dynamo-electric devices or dynamos, such as motors, generators, and the like, which are adapted to be operated in oil, water, or other normally harmful fluid, and has for an object the provision of improvements in this art.

The invention is particularly concerned with motor-pump units where the pump impeller, mixer, stirrer, or other driven element must be immersed in a liquid or where the motor is subject to contact with the liquid.

One of the particular objects of the invention is to provide a dynamo, especially a motor, in which the stator and rotor are both disposed within a cup-shaped casing and in which the stator is sealed in the casing by a non-magnetic cover shield which is sealed to the casing at each free edge and hermetically seals the stator against fluids.

Another object is to provide improved means for mounting a rotor in the casing, particularly with respect to its shaft bearing supports.

Another object is to provide improved fluid shielding cover means for the rotor, the cover comprising a thin non-magnetic metal enclosure completely covering the armature of the rotor and sealed to the rotor at its free edges.

Another object is to provide an improved pump casing which directly carries valve means, thus avoiding complicated, bulky, and expensive valved fittings which are usually required for pump installations.

Another object is to provide improved means for securing the stator casing, the pump casing, the stator shielding, and the rotor shaft bearing support together, and which further seals the joint and provides vibration absorbing means.

The above and other objects and advantages of the invention will be apparent from the following description of an exemplary embodiment, reference being made to the accompanying drawings thereof, wherein:

The single figure is a typical axial section through a motor-pump assembly embodying the present invention.

Referring to the drawings, a cup-shaped main casing 10 includes an end wall 10a, a peripheral wall 10b, an external end flange 10c, and an interior end boss 10d. The end wall and boss are provided with a hole or bore 10e to receive a shaft bearing sleeve 11. One end of a rotor shaft 12 is turnably mounted in the sleeve 11, the sleeve itself being forced into the bore to firmly retain its position. The shaft near its other end is rotatably mounted in another sleeve 11 pressed into the bore 13a of a bearing plate 13 covering the open end of the stator casing 10. Both of the bearings 11 are preferably of the self-lubricating type.

The bore 10e is sealed by a cap 14 and gasket 15, means such as screws 16 being used to hold the cap in place.

The shaft 12 carries end thrust rings 17 tightly pushed thereon and between them a spacer sleeve 18 is tightly fitted on the shaft. Since the sleeve is made fast on the shaft and rotates with it, it may be considered as a part of the shaft. It carries a rotor 19 which includes an armature 20 composed of the usual high-silicon steel laminations.

Within the casing 10 there is disposed the usual stator 21. The stator is sealed by a cup-shaped shielding cover or diaphragm 22 of a non-corrodible non-magnetic metal such, for example, as stainless steel. The free edges of the shielding cover are sealed to the casing 10, the inner or bottom edge around the opening provided for the shaft 12 being sealed by a gasket 23, such as an O ring of rubber-like material held by a clamp ring 24, and the outer edge being sealed by a gasket 25 held by the outer edge of the shaft bearing supporting plate 13.

The armature of the rotor is encased in a shielding cover or diaphragm 26 of thin non-magnetic metal, such as stainless steel. Preferably the cover 26 is formed of a cup-shaped part 26a and a top part 26b sealingly secured to the part 26a at the edge 26c. This may be a turned edge known in can making and sheet metal work, with sealing means if needed. Apertures are formed in the parts 26a and 26b for the shaft 12 and these edges are sealed by rubber-like grommet rings 27 fitting tightly on the shaft and embracing the metal edges around the openings.

The rotor shaft is adapted to have various kinds of operating elements secured on its free end, herein a pump impeller 30 being shown. It may be retained by a nut 31. A pump casing 32 is provided for the impeller 30, the casing having a flange portion 32a fitting against the outer edge of the main casing 10 to retain together the edge of the main casing 10, the edge of the shielding cover 22, and the edge of the bearing-carrying plate 13. A packing ring or gasket 25 is inserted between a shoulder on the edge of the casing 10 and the outer edge of the shielding cover 22 and a gasket 33 is inserted between the plate 13 and the flange 32a, as shown, to form a seal when the parts of this compound joint are clamped together.

The casings 10 and 32 are secured together by an angular ring 34 held by screws 34a and carrying a gasket 35 of rubber or the like which further seals the joint and provides vibration absorbing means.

The pump casing is provided with an inlet 32b and an outlet 32c. A valve 36 is provided in each the inlet and outlet, each valve comprising a stem 36a fitting in bearing holes, a plate or disk 36b of metal secured thereto, as by screws 36c, and a sealing plate or disk 36d, as of rubber-like material, secured to the metal disk 36b, as by a rivet 36e. The disk 36d fits tightly enough in the channel or port to retain the valve in any adjusted position. Besides, packing 36f held by nut 36g tends to hold the valve in position. The metal disk 36b is provided with a pivot point 36h which fits in a bearing in the port wall to provide with the stem 36a a shaft bearing support for the valve disks. The valve is turned by a pin 36j in its outer end.

One valve is shown open and one closed in the drawing for aid in illustration but it will be understood that in operation both valves are usually open or closed at the same time.

It is thus seen that the invention provides an improved assembly, an improved rotor shaft support, an improved casing joint connection, an improved fluid shielding means for stator and rotor, an improved pump casing carrying with it both inlet and outlet valves, improved valves for such a pump, and other improved elements and combinations of elements. The cover plate 13 keeps most of the fluid out of the motor casing, besides carrying the rotor bearing; but the stator is further and fully sealed by the shielding cover 22 and the armature by its shielding cover 26.

The impeller 30 and its casing 32 may be quickly interchanged with some other operating device and casing, as may be desired.

The parts are simple and sturdy, easily assembled, and durable in service. They are easily adapted for reversal, as rotor for stator. While a driving device, such as a motor, has been described, it is obvious that the invention applies also to a generator, the term dynamo comprehending all such dynamo-electric devices.

While one embodiment has been illustrated and described by way of example, it is to be understood that there may be various embodiments within the scope of the invention.

We claim:

1. In a dynamo in combination, a cup-shaped liquid-impervious stator casing, an annular stator disposed in said casing, a thin cup-shaped non-magnetic metal shielding cover enclosing said stator interiorly and having an opening in the bottom and an outturned flange at the upper end, said shielding cover being sealed at its bottom and upper edges to said casing, a rotor shaft rotatably mounted at the inner end in a bearing in the bottom wall of said casing and extending through the opening in the bottom of said shielding cover, the seal between the bottom of said shielding cover and said casing closely surrounding the inner shaft bearing, a bearing support member carried at the outer end of said casing carrying an outer bearing for the outer end of said shaft, a rotor mounted on the shaft, and a driven element carried by said shaft and actuated by said rotor, said driven element being disposed on the outer side of said bearing support member.

2. In a dynamo in combination, a cup-shaped liquid-impervious stator casing, an annular stator mounted in said casing, a thin cup-shaped outwardly flanged non-magnetic metal shielding cover enclosing said stator interiorly and sealed at the free edges in its bottom and at the outwardly flanged upper end to said casing, a bearing supporting plate for the outer end of said casing, a rotor carried by a shaft rotatably mounted at its inner end in the bottom of said casing and at its outer end in said plate, a driven element located outside said plate and driven by said rotor, and a second casing around said driven element, said stator casing, said shielding cover, said plate, and said second casing all having radially overlapping parts at a sealed outer circumferential joint assembly, and means clamping said parts together at said joint.

3. In a motor-pump in combination, a cup-shaped liquid-impervious stator casing having an inwardly extending boss on its bottom wall and a hole therethrough, a sealing cap over the outer end of said hole, a shaft bearing in said hole, a shaft rotatably mounted at its inner end in said bearing, an annular stator secured in said casing, a thin cup-shaped outwardly flanged non-magnetic metal shielding cover enclosing said stator interiorly, said shielding cover having a hole in the bottom receiving said shaft and being sealingly clamped at its free edge around the opening in its bottom to said boss and being clamped at its free outwardly flanged edge at its upper end to the outer edge of said stator casing, a rotor mounted on said rotor shaft, said rotor including an armature, a thin non-magnetic metal shielding cover fully enclosing said armature, said armature cover having a cylindrical side wall and end walls with holes in the end walls receiving the shaft, sealing means between said armature cover ends and said shaft, a plate over the open end of said stator casing, said plate having a hole carrying a bearing receiving said shaft, said plate at its outer edge fitting over the outwardly flanged edge of said stator shielding cover, said shaft extending out through said plate, a pump impeller secured on the outer end of said shaft, a pump casing around said impeller, said pump casing having its outer edge overlying the outer edge of said plate, resilient shock-absorbing sealing packing between the outer edges of said stator casing and said shielding cover, and between said plate and said pump casing, an angular clamping ring around the outer edge of said stator casing, resilient shock-absorbing sealing packing within said clamping ring, and means securing said clamping ring upon the edges of the stator casing and pump casing and holding them in clamped and sealed relationship.

4. In a dynamo in combination, a main cup-shaped liquid-impervious stator casing having an outside flange on its upper edge, an annular stator mounted in said stator casing, a stator shielding covering said stator and having an outer edge overlying the outer edge of said stator casing, a plate over the outer end of said stator casing and having an outer edge overlying the outer edge of said stator casing and said shielding cover, a rotor mounted in said stator casing, an impeller outside said plate driven by said rotor, an impeller casing having outer edges overlying the outer edges of said stator casing, shielding cover, and plate, resilient sealing packing between the outer edges of the stator casing and shielding cover, and of the plate and impeller casing, resilient sealing packing surrounding the outer edge of said stator casing, an annular shoulder on the outer edge of said stator casing and an angular clamping ring secured to said impeller casing and embracing the annular shoulder on said stator casing and the surrounding packing and clamping all of said outer edges together.

5. In a dynamo in combination, a casing, an annular stator in said casing, a rotor comprising an armature rigidly mounted on a rotary shaft unit within said casing, a shielding cover mounted over said armature, said shielding cover including a cup-shaped portion and a top portion secured to the cup-shaped portion, the top portion and the bottom of the cup-shaped portion having each a hole therein receiving the rotor shaft unit and presenting free edges toward the shaft unit, and rings engaging said free edges and sealing them around the holes to the rotor shaft unit, the shielding cover with the said edge sealing rings forming a complete fluid-tight enclosure over the rotor armature.

6. In a dynamo in combination, a casing, an annular stator in said casing, a rotor comprising an armature rigidly mounted on a rotary shaft unit within said casing, a shielding cover mounted over said armature, said shielding cover including a cup-shaped portion and a top portion secured to the cup-shaped portion, the top portion and the bottom of the cup-shaped portion having each a hole therein receiving the rotor shaft unit and presenting free edges toward the shaft unit, and means engaging said free edges and sealing them around the holes to the rotor shaft unit, the shielding cover with the said edge sealing means forming a complete fluid-tight enclosure over the rotor armature, said edge-sealing means comprising a grooved elastic grommet on the shaft unit at each end of the shielding cover, said grommets tightly embracing the free edges of the shielding cover around the holes for the shaft unit and tightly embracing the shaft unit.

RINALDO F. PEZZILLO.
ANTHONY H. PEZZILLO.
GEORGE C. TATEM.

References Cited in the file of this patent

UNITED STATES PATENTS

| Number | Name | Date |
|---|---|---|
| 1,781,082 | Ruegger | Nov. 11, 1930 |
| 1,974,183 | Gunderson | Sept. 18, 1934 |
| 2,004,866 | Haldeman | June 11, 1935 |
| 2,243,464 | Kucher | May 27, 1941 |
| 2,400,192 | Coons | May 14, 1946 |
| 2,430,337 | Heckert | Nov. 4, 1947 |
| 2,497,650 | Anderson | Feb. 14, 1950 |

FOREIGN PATENTS

| Number | Country | Date |
|---|---|---|
| 214,643 | Great Britain | Oct. 16, 1924 |